3,527,779
CARBOXYLIC ACID PREPARATION
Bernard Paulis, The Hague, and Henk G. Merkus and Jan P. Campen, Amsterdam, Netherlands, assignors to Shell Oil Company, New York, N.Y., a corporation of Delaware
No Drawing. Filed Apr. 16, 1969, Ser. No. 816,790
Claims priority, application Great Britain, Nov. 15, 1968, 54,332/68
Int. Cl. C11c 1/00
U.S. Cl. 260—413                           3 Claims

ABSTRACT OF THE DISCLOSURE

A process for the preparation of carboxylic acid from olefin, CO, and water at temperatures of from about 60° to about 150° using a relatively noncorrosive catalyst of critical amounts of $BF_3$, $H_2O$, and $H_3PO_4$.

BACKGROUND OF THE INVENTION

It is known that organic acids are obtained by contacting mixtures containing carbon monoxide, water and olefinically unsaturated organic compound, with certain specific catalysts under controlled conditions of temperature and pressure. Processes have been disclosed heretofore which rely upon the use of exceedingly high pressures, often in combination with relatively high temperatures, generally in excess of 150° C. and often higher than 375° C. These processes have not led to practical scale application. This is attributable not only to inability to obtain therewith consistently desired carboxylic acids in yields commensurate with practical scale operation, but because the high pressures, often many hundreds of atmospheres, combined with the corrosiveness of the reaction mixtures made too heavy a demand on practical scale equipment.

More recently, there was discovered the two stage process for the production of organic acids from carbon monoxide, water and olefinically unsaturated compounds, using liquid highly acidic inorganic catalysts, effective at relatively low temperatures and pressures. This process has the disadvantages of requiring two reaction stages and having a highly corrosive catalyst system. A suitable process of this type is described in U.S. Pat. 2,831,877 issued to Herbert Koch.

U.S. Pat. 3,059,004 issued to Marinus J. Waale et al. describes a single stage process for the production of organic acids. Mixtures of $BF_3$ and water are preferred catalysts in this technically attractive process. If a mixture of $BF_3$ and water is used as catalyst, water must be present in amount of at least one molecule per molecule of $BF_3$ in order to obtain good catalyst activity and in order to obtain at the end of the reaction, after settling of the reaction mixture, separation into two layers, one containing the carboxylic acid formed, the other containing the catalyst. The lower the number of carbon atoms present in the carboxylic acid formed, the higher the amount of water necessary per molecule $BF_3$ in order to obtain a ready separation. Too large an excess of water causes a decline in catalyst activity.

A large excess of water during reaction becomes increasingly undesirable at higher temperatures, the reaction of olefin with CO and water being exothermic; when operating on a large production scale it is advantageous to carry out the reaction at somewhat elevated temperatures, e.g., about 50–120° C., so that efficient cooling, e.g., with water at room temperature, can be effected. Carrying out the reaction at these temperatures with the aid of a $BF_3/H_2O$ mixture, containing more than one molecule $H_2O$ per molecule $BF_3$, has the disadvantage that the $BF_3$ is hydrolyzed at an appreciable rate which leads to loss of catalyst and deposition of solid material (e.g., oxides and acids if boron). In order to preclude this hydrolysis, strong oxygen-containing acids can be added to the catalyst, phosphoric acid ($H_3PO_4$) being very suitable for this purpose.

The $BF_3$-water-phosphoric acid catalysts according to Waale et al. generally comprise a large excess of water over the stoichiometric amount and a molar ratio of $BF_3$ to phosphoric acid of from about 0.8 to 1.3 to about 1.3 to 0.8. These catalyst systems, while avoiding to a substantial degree the problem of hydrolysis of $BF_3$ and permitting product phase separations, give rise to the formation of an appreciable amount of products other than the desired carboxylic acids, and to severe corrosion of the materials used for the construction of reactor, pipes, pumps, etc.

STATEMENT OF THE INVENTION

A process for the preparation of carboxylic acids has now been found which comprises contacting, at a temperature in the range of from about 60° C. to about 150° C., a monoolefinically unsaturated organic compound and carbon monoxide with a catalyst consisting of a mixture of $H_3PO_4$, $BF_3$ and $H_2O$, the molar ratio of $H_2O$ to $BF_3$ in the said mixture having a value between about 1 to 1 and about 2.3 to 1 and the molar ratio of $BF_3$ to $H_3PO_4$ having a value between about 2 to 1 and about 20 to 1. Use of this novel catalyst mixture and special temperature range makes it possible to react olefinically unsaturated organic compounds with CO and $H_2O$ to give high yields of carboxylic acid, good separation between the carboxylic acid formed and the catalyst being obtained after reaction, the heat set free being easily removed, the catalyst not decomposing to an undesired extent owing to hydrolysis, and commercial materials being used for the equipment without these materials being heavily corroded.

DESCRIPTION OF PREFERRED EMBODIMENTS

Olefinically unsaturated organic compounds, useful in the process according to the invention, comprise olefinically unsaturated hydrocarbons and olefinically unsaturated non-hydrocarbons such as, for example, oleic acid. Olefinically unsaturated hydrocarbons (olefins) are preferred.

Preferred olefins have from 3 to about 18 carbons, such as, for example, propene, butene-1, butene-2, isobutene, branched or non-branched pentenes, hexenes, octenes, nonenes, decenes; oligomers of lower olefins such as trimers or tetramers of propene, dimers or trimers of isobutene; cyclic alkenes such as cyclopentene and cyclohexene. Isobutene and oligomers thereof, in particular diisobutene, are especially preferred.

Mixtures of olefins also can be used as starting materials for the preparation of carboxylic acids according to the invention.

The process according to the invention is suitably effected at temperatures between about 60° C. and about 150° C.; in this range the heat of reaction can very conveniently be removed while few undesired side reactions occur. In particular, temperatures between about 80° C. and about 120° C. are preferred.

The molar ratio of $H_2O$ to $BF_3$ is suitably maintained between about 1 to 1 and about 2.3 to 1, these ratios giving optimal catalytic activity. Preferred are molar ratios of $H_2O$ to $BF_3$ between about 1 to 1 and about 2 to 1 with ratios between about 1.2 to 1 and about 2 to 1 being especially preferred.

The molar ratio of $BF_3$ to $H_3PO_4$ is suitably maintained between about 2 to 1 and about 20 to 1 with ratios between about 2 to 1 and about 10 to 1 being preferred. More preferred are molar ratios of $BF_3$ to $H_3PO_4$ of from about 2.5 to 1 to about 6 to 1 with ratios of from about 3 to 1 to about 4.5 to 1 being especially preferred.

The volume ratio of catalyst (i.e., $H_3PO_4$, $BF_3$, and water) to olefin may vary between wide limits. Volume ratios between about 6 to 1 and about 0.5 to 1 are very suitable with volume ratios between about 4 to 1 and about 1 to 1 being preferred.

The CO pressure during the process of the invention can be varied between wide limits. Pressures above 250 kg./cm.$^2$ can be used, but make high demands on the construction of the reactor. It is very convenient for the preparation of carboxylic acids to be carried out at a CO pressure between 10 and 250 kg./cm.$^2$; particularly suitable are CO pressures between 30 and 150 kg./cm.$^2$.

The presence of an inert diluent during the reaction is advantageous in that it minimizes the formation of undesired byproducts. Very favorable results are obtained when liquid saturated hydrocarbons are used as inert diluent. Preferred hydrocarbons are lower acyclic or alicyclic alkanes, e.g., pentane, hexane, heptane and octane and mixtures thereof. An especially preferred diluent is n-heptane or a mixture consisting substantially of n-heptane.

The process according to the invention may be carried out batchwise or continuously. Batchwise operation may be conveniently effected by introduction of the olefin, CO and, if desired, inert diluent into a reactor which contains the catalyst. If the acid derived from the olefin introduced by addition of one mole CO and one mole $H_2O$ to one mole of that olefin is the desired product it is advantageous to keep the contents of the reactor in vigorous motion (e.g., by stirring), in order that the olefin introduced is contacted with CO as soon as possible.

If the reaction is carried out in batch, the $H_2O$ content of the catalyst mixture of $BF_3$, $H_3PO_4$ and $H_2O$ decreases, as $H_2O$ is built in the carboxylic acids formed. For that reason in most cases it will be necessary to add water during the reaction in order to keep the molar ratio of $H_2O$ to $BF_3$ of the catalyst between the limits set.

At the end of the reaction the addition of CO and olefin and diluent is stopped and the reaction mixture, which is no longer kept in vigorous motion, settles to form a catalyst layer and an organic layer which contains the carboxylic acids, and from which the carboxylic acids can be isolated by conventional means, e.g., by distillation, by crystallization or via esters or salts.

It is also possible to separate the organic layer and the catalyst layer with the aid of devices such as a centrifuge.

The catalyst layer can be reused.

The process of the invention is preferably carried out continuously. In this embodiment of the invention a mixture of $H_3PO_4$, $BF_3$ and $H_2O$, the olefin(s) and CO are continuously introduced into a reactor, the contents of the reactor are continuously withdrawn from it, and the catalyst layer and the organic layer containing the carboxylic acid are separated from one another (e.g., in a centrifuge or a settler).

The separation can be carried out after pressure release, but it is also possible to separate the said layers under the pressure at which the reaction is carried out. The catalyst layer is preferably returned to the reactor.

In continuous operation it is necessary to continuously add water to the catalyst mixture to compensate for the water consumed in the carboxylic acid formation and thus to maintain the catalyst in the reactor within the desired proportions.

Carrying out the reaction in a vigorously stirred reactor and in the presence of an inert diluent has the same beneficial effects described for a batch process.

EXAMPLE I

In each experiment in a stirred one-litre autoclave provided with a four-blade peddle stirrer which contained 200 ml. of a mixture of $H_3PO_4$, $BF_3$ and $H_2O$, isobutene and water were simultaneously introduced, by pumping, at a rate of, respectively, 240 and 60 grams per hour. The CO pressure was kept constant at 100 kg./cm.$^2$ by adding gaseous CO. After 30 minutes the addition of isobutene and water was discontinued, and when CO absorption ceased the pressure was released. In a separatory funnel the reactor contents separated into two layers, the upper-organic-layer containing the carboxylic acids formed. The lower-catalyst-layer was extracted three times with pentane, and the combined organic layers were washed with saturated sodium chloride and dried. The bulk of the solvent was distilled off. The composition of the remaining reaction product was determined with the aid of gas chromatography.

In all cases the conversion of the isobutene was above 99.9%.

In Table I the results are given of several experiments in which the ratios between $H_3PO_4$, $BF_3$ and $H_2O$, and the temperature were varied.

EXAMPLE II

All experiments, in which the ratio between $H_3PO_4$, $BF_3$ and $H_2O$, and the temperature were varied, were carried out as described in Example I, the difference being that diisobutene was used as the starting olefin instead of isobutene.

The results are given in Table II.

TABLE I

| | Reaction conditions | | | | Selectivity (percent m. on isobutene intake) | | | |
|---|---|---|---|---|---|---|---|---|
| | Temp., °C. | Molar ratio of catalyst components | | | | | | |
| Exp. No. | | $H_3PO_4$ | $BF_3$ | $H_2O$ | $C_5$ acids | $C_9$ acids | $C_{13}$ acids | Neutral compounds |
| 1 | 41 | 1 | 2.37 | 6.72 | 5 | | | 95 |
| 2 | 40 | 1 | 2.51 | 4.96 | 37 | 10 | | 53 |
| 3 | 61 | 1 | 2.51 | 4.96 | 75 | 25 | | |
| 4 | 60 | 1 | 2.50 | 4.99 | 74 | 22 | 4 | |
| 5 | 40 | 1 | 2.68 | 5.12 | 59 | 13 | | 28 |
| 6 | 60 | 1 | 2.68 | 5.12 | 81 | 18 | 1 | |
| 7 | 41 | 1 | 3.00 | 5.62 | 56 | 14 | 1 | 29 |
| 8 | 61 | 1 | 3.00 | 5.62 | 70 | 22 | 4 | 4 |
| 9 | 40 | 1 | 3.50 | 6.34 | 75 | 19 | 6 | |
| 10 | 60 | 1 | 3.50 | 6.34 | 80 | 17 | 3 | |
| 11 | 40 | 1 | 4.00 | 6.80 | 76 | 17 | 7 | |
| 12 | 60 | 1 | 4.00 | 6.50 | 82 | 15 | 3 | |
| 13 | 61 | 1 | 4.00 | 6.80 | 88 | 12 | | |

TABLE II

| Exp. No. | Reaction conditions | | | | Selectivity (percent m. on isobutene intake) | | | |
|---|---|---|---|---|---|---|---|---|
| | Temp., °C. | Molar ratio of catalyst components | | | $C_5$ acids | $C_9$ acids | $C_{53}$ acids | Neutral Compounds |
| | | $H_3PO_4$ | $BF_3$ | $H_2O$ | | | | |
| 14 | 60 | 1 | 3.00 | 5.00 | 39 | 55 | 1 | 5 |
| 15 | 60 | 1 | 3.50 | 6.30 | 47 | 53 | | |
| 16 | 8 | 1 | 4.00 | 6.50 | 7 | 86 | 6 | 1 |
| 17 | 20 | 1 | 4.00 | 6.50 | 12 | 84 | 4 | |
| 18 | 40 | 1 | 4.00 | 6.50 | 29 | 70 | | 1 |
| 19 | 60 | 1 | 4.00 | 6.50 | 42 | 56 | 1 | 1 |
| 20 | 63 | 1 | 4.00 | 6.50 | 63 | 35 | | 2 |
| 21 | 80 | 1 | 4.00 | 6.50 | 73 | 27 | | |

EXAMPLE III

A continuous experiment was carried out by separately introducing into a vigorously stirred reactor a catalyst consisting of $H_3PO_4$, $BF_3$ and $H_2O$ in the molar ratio of 1 to 4 to 6.78, and a mixture of isobutene and CO, the latter mixture being introduced near the tips of the stirrer blades. The contents of the reactor were continuously withdrawn from it. In the reactor the CO pressure was maintained at 100 kg./cm.$^2$, the temperature at 100° C. 143.5 kg. isobutene per m.$^3$ reactor volume was fed per hour, the volume ratio between catalyst and isobutene fed being kept at 2 to 1. The residence time of the materials in the reactor was 1.5 hours. The ratio between $H_3PO_4$, $BF_3$ and $H_2O$ present in the reactor at equilibrium was 1 to 4 to 5.32. From the reaction product obtained the pressure was released; the reaction product separated into an upper organic layer, and a lower inorganic layer comprising $H_3PO_4$, $BF_3$ and $H_2O$. The organic layer which contained the carboxylic acids formed was washed with water, and analysed with the aid of gas chromatography. It contained 93.5% α,α-dimethylpropionic acid, 1.4% carboxylic acids with 6, 7 or 8 carbon atoms, 2.7% carboxylic acids with 9 carbon atoms and 2.4% carboxylic acids with 13 carbon atoms. Less than 0.1% of neutral compounds was found. All percentages given refer to the amount of isobutene fed into the reactor having been converted to the compound in question. The conversion of isobutene was quantitative. So much water was added to the inorganic layer that the ratio between $H_3PO_4$, $BF_3$ and $H_2O$ contained in that layer was 1 to 4 to 6.78; this layer was recycled to the reactor.

EXAMPLE IV

A number of continuous experiments were carried out each by separately introducing into a vigorously stirred reactor a mixture of $H_3PO_4$, $BF_3$ and $H_2O$ and a mixture of isobutene, n-heptane and CO, the latter mixture being introduced near the tips of the stirrer blades. The contents of the reactor were continuously withdrawn from it, and the reaction product treated as described in Example III; the water content of the mixture of $H_3PO_4$, $BF_3$ and $H_2O$ was readjusted before recycling. The reactor temperature was kept at 100° C. The residence time of the materials in the reactor was 1.5 hours. The isobutene conversion was quantitative. The composition of the mixture of $H_3PO_4$, $BF_3$ and $H_2O$, the CO pressure, the feed rate of isobutene, and the catalyst/isobutene volume ratio were varied.

Table III shows the results.

TABLE III

| Exp. No. | Reaction conditions | | | | | | | | Selectivity (percent m. on isobutene intake) | | | | |
|---|---|---|---|---|---|---|---|---|---|---|---|---|---|
| | Pressure kg./cm.$^2$ | Molar ratio of catalyst components introduced | | | $H_2O/BF_3$ molar ratio in reactor | Heptane/ isobutene volume ratio | Catalyst/ isobutene volume ratio | Isobutene introduced kg./m.$^3$ reactor volume, h. | $C_5$ acids | $C_6$, $C_7$, $C_8$ acids | $C_9$ acids | $C_{13}$ acids | Neutral compounds |
| | | $H_3PO_4$ | $BF_3$ | $H_2O$ | | | | | | | | | |
| 22 | 100 | 1 | 4 | 6.56 | 1.25 | 1/1 | 2.0/1 | 103 | 94.0 | 0.8 | 4.8 | 0.3 | 0.1 |
| 23 | 100 | 1 | 4 | 6.94 | 1.39 | 1/1 | 2.3/1 | 143.3 | 96.6 | 0.1 | 2.9 | 0.3 | 0.1 |
| 24 | 100 | 1 | 4 | 7.67 | 1.31 | 1/1 | 1.3/1 | 143.5 | 94.7 | 0.8 | 2.6 | 1.8 | 0.1 |
| 25 | 100 | 1 | 4 | 7.38 | 1.53 | 1/1 | 2.8/1 | 143.5 | 97.6 | 0.2 | 2.1 | <0.1 | <0.1 |
| 26 | 100 | 1 | 4 | 7.61 | 1.48 | 1/1 | 1.9/1 | 143.5 | 94.8 | 0.4 | 4.2 | 0.5 | 0.1 |
| 27 | 70 | 1 | 4 | 7.22 | 1.40 | 1/1 | 1.9/1 | 143.5 | 97.3 | 0.5 | 2.0 | <0.1 | 0.2 |
| 28 | 50 | 1 | 4 | 7.50 | 1.57 | 1/1 | 2.6/1 | 143.5 | 92.3 | 0.6 | 5.2 | 1.8 | 0.1 |

EXAMPLE V

Two continuous experiments at 60° C. and 100° C. were carried out each by separately introducing into a vigorously stirred reactor a mixture of $H_3PO_4$, $BF_3$ and $H_2O$ and a mixture of diisobutene and CO, the latter mixture being introduced near the tips of the stirrer blades. The contents of the reactor were continuously removed from it, and the reaction product treated as described in Example III; the water content of the mixture of $H_3PO_4$, $BF_3$ and $H_2O$ were readjusted before recycling. The catalyst/diisobutene volume ratio was kept at 2 to 1, the pressure at 70 kg./cm.$^2$, the feed rate of the diisobutene at 168.2 kg. per m.$^3$ reactor volume·h. and the residence time of the contents of the reactor at 1.5 h. The diisobutene conversion was quantitative.

Table IV shows the results.

TABLE IV

| Exp. No. | Reaction conditions | | | | | Selectivity (percent m. on diisobutene intake) | | | | |
|---|---|---|---|---|---|---|---|---|---|---|
| | Temp., °C. | Molar ratio of catalyst components introduced | | | $H_2O/BF_3$ molar ratio in reactor | $C_5$ acids | $C_6$, $C_7$, $C_8$ acids | $C_9$ acids | $C_{53}$ acids | Neutral compounds |
| | | $H_3PO_4$ | $BF_3$ | $H_2O$ | | | | | | |
| 29 | 60 | 1 | 4 | 6.33 | 1.24 | 46.2 | 1.6 | 46.5 | 5.7 | <0.1 |
| 30 | 100 | 1 | 4 | 6.44 | 1.18 | 81.7 | 2.5 | 15.8 | <0.1 | <0.1 |

EXAMPLE VI

Continuous experiments at 60° C. and 100° C. were carried out each by introducing separately into a vigorously stirred reactor a mixture of $H_3PO_4$, $BF_3$ and $H_2O$ and a mixture of diisobutene, n-heptane and CO, the latter mixture being introduced near the tips of the stirrer blades. The contents of the reactor were continuously removed from it, and the reaction product treated as described in Example III; the water content of the mixture of $H_3PO_4$, $BF_3$ and $H_2O$ was readjusted before recycling. The n-heptane/diisobutene volume ratio was kept at 2 to 1, the CO pressure at 70 kg./cm.$^2$, the diisobutene feed rate at 168.2 kg./m.$^3$ reactor volume·h., and the residence time of the reactor contents at 1.5 hours. The diisobutene conversion was quantitative. Table V shows the results.

TABLE V

| | Reaction conditions | | | | | | Selectivity (percent m. on diisobutene intake) | | | | |
|---|---|---|---|---|---|---|---|---|---|---|---|
| | Temp., °C. | Molar ratio of catalyst components introduced | | | $H_2O/BF_3$ molar ratio in reactor | Catalyst/ diisobutene volume ratio | $C_5$ acids | $C_6$, $C_7$, $C_8$ acids | $C_9$ acids | $C_{13}$ acids | Neutral compounds |
| Exp. No. | | $H_3PO_4$ | $BF_3$ | $H_2O$ | | | | | | | |
| 31 | 60 | 1 | 4 | 6.67 | 1.32 | 2.0/1 | 42.7 | <0.1 | 57.3 | <0.1 | <0.1 |
| 32 | 100 | 1 | 4 | 7.61 | 1.45 | 2.0/1 | 82.3 | 0.6 | 17.1 | <0.1 | <0.1 |
| 33 | 100 | 1 | 4 | 6.62 | 1.18 | 1.9/1 | 85.0 | 1.9 | 13.1 | <0.1 | <0.1 |

We claim as our invention:

1. In the process for the direct, single stage production of monocarboxylic acids wherein a monoolefinic hydrocarbon of from 3 to 18 carbon atoms is reacted with carbon monoxide in the presence of a complex catalyst consisting essentially of $H_3PO_4$, $BF_3$ and $H_2O$, at a partial pressure of carbon monoxide of from about 30 to about 150 kg./cm.$^2$, the improvement consisting essentially of effecting said reaction at a temperature in the range of from about 60° to about 150° C. while maintaining the molar ratio of $H_2O$ to $BF_3$ in said catalyst between about 1:1 and about 2.3:1 and the molar ratio of $BF_3$ to $H_3PO_4$ in said catalyst between about 2:1 and about 20:1 throughout said reaction.

2. A process in accordance with claim 1 wherein the molar ratio of $H_2O$ to $BF_3$ is from about 1.2 to 1 to about 2 to 1, the molar ratio of $BF_3$ to $H_3PO_4$ is from about 2.5 to 1 to about 6 to 1 and the temperature is in the range of from about 80° C. to about 120° C.

3. A process in accordance with claim 2 wherein said olefinic hydrocarbon is selected from the group consisting of isobutene and diisobutene.

References Cited
UNITED STATES PATENTS 3,205,244   9/1965   Sumerford et al. _____ 260—514
3,296,286   1/1967   Wehe et al. _____ 260—413
3,349,107   10/1967   Pawlenko _____ 260—413

LEWIS GOTTS, Primary Examiner

E. G. LOVE, Assistant Examiner

U.S. Cl. X.R.

260—514, 533